C. BOHM.
CORN HARVESTER.
APPLICATION FILED MAY 28, 1918.

1,285,005.

Patented Nov. 19, 1918.

Inventor
Charles Bohm
By C. W. Parker, Attorney

UNITED STATES PATENT OFFICE.

CHARLES BOHM, OF DU BOIS, NEBRASKA.

CORN-HARVESTER.

1,285,005.   Specification of Letters Patent.   Patented Nov. 19, 1918.

Application filed May 28, 1918. Serial No. 237,051.

*To all whom it may concern:*

Be it known that I, CHARLES BOHM, a citizen of the United States, residing at Du Bois, in the county of Pawnee and State of Nebraska, have invented certain new and useful Improvements in Corn-Harvesters, of which the following is a specification.

My invention relates to improvements in corn harvesters.

An important object of the invention is to provide a corn harvester which may be driven down a row of corn and will remove the ears of corn from the stalk and discharge the same at a suitable point, in an expeditious manner.

Other objects and advantages of the invention will be apparent during the course of the following description.

In the accompanying drawings forming a part of this specification and in which like numerals are employed to designate like parts throughout the same.

Figure 1:
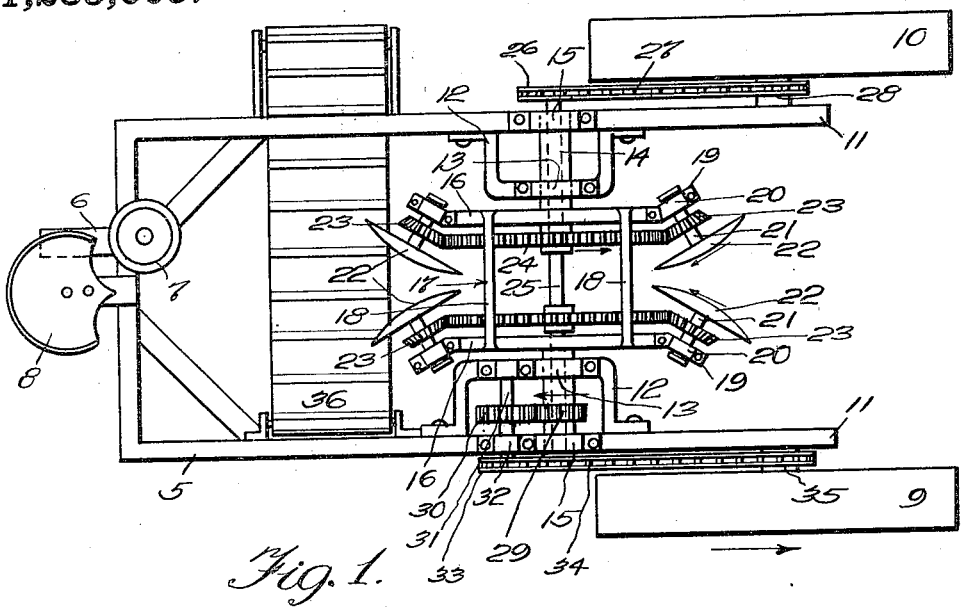
Figure 1 is a plan view of a corn harvester embodying my invention.

In the drawings, wherein for the purpose of illustration is shown a preferred embodiment of my invention, the numeral 5 designates a main frame, the rear end of which is supported by a steering wheel 6, turned by a handle 7, arranged near an operator's seat 8. The forward end of the main frame 5 is supported by traction wheels 9 and 10, pivoted thereto, as shown.

Arranged inwardly of the longitudinal beams 11 of the main frame are U-shaped brackets 12, rigidly secured thereto. These brackets have bearings 13, within which transverse sleeves 14 are journaled. The sleeves 14, at their outer ends, are journaled in bearings 15, rigidly secured to the longitudinal beams 11. Rigidly connected with the inner ends of the sleeves 14 are rotatable carriers or bars 16, provided near their ends with transverse arms 17, having connecting portions 18, as shown. It is thus apparent that the two carriers or bars 16 rotate together as a unit.

At their ends, the carriers 16 are provided with angularly disposed extensions 19, to which are rigidly secured bearings 20, arranged at an angle, and having angularly arranged stub-shafts 21 journaled therein. These stub-shafts at their inner ends carry husking disks 22, rigidly secured thereto. Rigidly secured to the stub-shafts 21 are bevel gears 23, engaging larger bevel gears 24, rigidly secured to a transverse shaft 25, journaled within the sleeves 14, and rotatable therein.

The shaft 25 receives its rotation from a sprocket wheel 26, engaged by a sprocket chain 27, engaging a sprocket wheel 28 connected with the traction wheel 10, to be driven thereby.

One sleeve 14 carries a gear 29, engaged by a gear 30 rigidly secured to a shaft 31, journaled through bearings 32. The shaft 31 receives its rotation from a sprocket wheel 33 driven by a sprocket chain 34 engaging a sprocket wheel 35 secured to the traction wheel 9, to be driven thereby.

Arranged rearwardly of and near the harvesting mechanism is a transverse endless belt 36, suitably connected with the frame 5 and driven by any suitable means. This transverse belt receives the ears of corn stripped from the stalks and serves to conduct the same from proximity to the harvesting mechanism.

Figure 2:
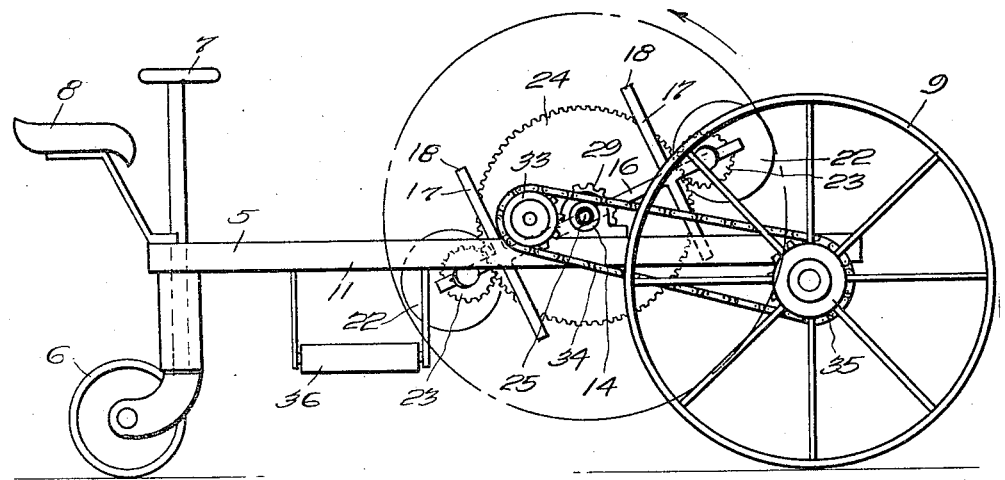
Fig. 2 is a side elevation of the same.

The operation of the apparatus is as follows:

The machine is driven longitudinally down a row of corn, the traction wheels 9 being disposed upon opposite sides of the row. The carriers or supports 16 rotate counter-clockwise, as indicated by the arrow in Fig. 2, thereby turning the stripping disks 22 upwardly into contact with the ears of corn, the stalks of corn passing between the angularly arranged disks 22. While rotating bodily in a counter-clockwise direction the disks 22 are turning upon their axes in a counter-clockwise direction which is caused by the bevel gear 24 rotating clockwise and engaging with the bevel gears 23, as is obvious. These husking disks strip the ears of corn from the stalks and throw the same upon the transverse belt 36, to be conducted thereby from proximity to the harvesting mechanism.

It is to be understood that the form of my invention herewith shown and described is to be taken as a preferred example of the same, and that various changes in the shape, size, and arrangement of parts may be resorted to without departing from the spirit of the invention or the scope of the subjoined claim.

Having thus described my invention, what I claim is:

A corn harvester of the character described, comprising a wheeled frame, a pair of bearings secured to the frame, a pair of sleeves journaled within the bearings, a transverse shaft journaled within and through the sleeves, a pair of diametrically extending bars secured to the inner ends of the sleeves, means to rigidly secure the bars together, bearings secured to the opposite ends of the bars and arranged at an angle with relation thereto and diverging outwardly, angularly arranged stub-shafts journaled within the bearings, stripping disks secured to the forward ends of the stub-shafts and angularly arranged and diverging outwardly, bevel gears secured to the opposite ends of the stub-shafts, large bevel gears arranged inwardly of said bars and secured to the sleeves and engaging the first named bevel gears, driving connecting means between one sleeve and the wheel of the frame, and driving connecting means between the shaft and the other wheel of the frame.

In testimony whereof I affix my signature in presence of two witnesses.

CHARLES BOHM.

Witnesses:
L. C. FARWELL,
H. S. FARWELL.

Copies of this patent may be obtained for five cents each, by addressing the "Commissioner of Patents, Washington, D. C."